UNITED STATES PATENT OFFICE.

JOHN F. DICKSON, OF BINGHAMTON, NEW YORK.

PAINT AND VARNISH REMOVER.

No. 853,685.     Specification of Letters Patent.     Patented May 14, 1907.

Application filed January 16, 1907. Serial No. 352,652.

*To all whom it may concern:*

Be it known that I, JOHN F. DICKSON, a citizen of the United States, residing at Binghamton, New York, have invented certain new and useful Improvements in Paint and Varnish Removers, of which the following is a specification.

My said invention relates to a composition for the removal of all kinds of paints, varnishes and shellac.

The object of the invention is to secure the saving of time, labor and expense to the user of the composition by the provision of a remover which will be rapid in action and capable by one application of removing all kinds of paints, varnishes and shellac from wood surfaces without raising the grain of the wood or discoloring it. I have also aimed to provide a composition not injurious to the hands or detrimental to the health of the user, and which will be free from any disagreeable odor.

I have found that a composition containing acetone, benzol, comm'l toluol, acetic acid, benzin, spermaceti, and paraffin wax will accomplish all of the aforesaid objects in a most expeditious and satisfactory manner. I have found that acetone is a practicable solvent for certain gums, such as for instance as shellac, sandarac, and mastic, but will not dissolve damar gum or gum arabic, which are also extensively used in the making of varnishes, and that it possesses properties of heat which when retained will soften the gums soluble therein and render them easily removed. I have also found that benzol is an effectual solvent for damar gum, gum arabic and guttapercha, and the oily substances which are used in paints and varnishes, and has heat properties acting upon these gums in the same manner that acetone has upon the gums soluble therein. I have also discovered that toluol when used in connection with the other ingredients of my composition increases the heat and solvent qualities of the other chemicals and causes the paints and varnishes to be the more readily dissolved. I have further found that by including acetic acid I can retard the evaporation of the other chemicals, thereby causing them to act more effectually and yet the solvent properties of the composition will not be lessened, the acetic acid being in itself a solvent.

In order to further prevent the evaporation of the solvents while they are acting upon and dissolving the paints or varnishes, I use a spermaceti which is saponified by benzin to form on the composition being applied to the wood, a film over the surface of the chemicals, preventing their evaporation until the paint or varnish is dissolved. Spermaceti being expensive experiments have proved to me that paraffin wax may be used in conjunction with the spermaceti, lessening the cost of production, and owing to the relative specific gravities the combination of spermaceti and paraffin wax will be held in suspension and produce most excellent results.

I have found that the most satisfactory proportions are as follows:—acetone 8 gallons, 90% benzol 2 gallons, commerical toluol 2 gallons, acetic acid 1 gallon, 67%, benzin 1 gallon, paraffin wax, 2 pounds, spermaceti, 2 pounds. The most effective manner of mixing these ingredients is to place the spermaceti and paraffin wax in a tank of benzin which is thoroughly agitated until all lumps have disappeared and then add the acetone, benzol, toluol, and acetic acid, when with a few minutes further agitation the remover will be ready for use.

The composition may be applied with a brush or as a spray to the surface from which the paint or varnish is to be removed. After standing for a minute or so the paint or varnish will become honey combed. When agitation has ceased, which will not take more than three minutes, the paint or varnish may be easily removed with a putty knife or a piece of waste saturated with the solution, leaving the wood surface bare and in a perfect condition for refinishing without the necessity of smoothing or polishing.

Having thus described my invention, what I claim is:—

A paint and varnish remover containing the following ingredients and in the proportions specified, to-wit:—acetone—8 gls. Benzol—2 gls. Com'l. toluol—2 gls. Acetic acid—1 gal. Paraffin wax—2 lbs. Spermaceti—2 lbs. Benzin—1 gal.

In testimony whereof, I affix my signature in presence of two witnesses.

JOHN F. DICKSON.

Witnesses:
FRANKLIN J. BAYLISS,
KATHERINE G. CHICHESTER.